United States Patent [19]

Yamamoto et al.

[11] 4,110,260
[45] Aug. 29, 1978

[54] ELECTROCONDUCTIVE COMPOSITE CERAMICS

[75] Inventors: Hirotaka Yamamoto; Satoshi Sendai; Hideaki Ninomiya, all of Tokyo, Japan

[73] Assignee: Tokyo Denki Kagaku Kogyo Kabushiki Kaisha (TDK Electronics Co., Ltd.), Tokyo, Japan

[21] Appl. No.: 725,457

[22] Filed: Sep. 22, 1976

[30] Foreign Application Priority Data

Sep. 25, 1975 [JP] Japan .................................. 50/115904
Jun. 11, 1976 [JP] Japan .................................. 51/68307

[51] Int. Cl.$^2$ ............................................. H01B 1/08
[52] U.S. Cl. .................................. 252/519; 252/508; 252/509; 252/514; 252/516; 252/517; 252/518; 252/520; 252/521; 252/507; 252/513; 106/52
[58] Field of Search ............... 252/518, 514, 519, 521, 252/520, 508, 509, 507, 516; 106/39.6, 39.7, 62

[56] References Cited

U.S. PATENT DOCUMENTS

| | | | |
|---|---|---|---|
| 2,901,442 | 8/1959 | Huffadine et al. ................... 252/508 |
| 3,394,087 | 7/1968 | Huang et al. ..................... 252/518 X |
| 3,437,468 | 4/1969 | Seufert ..................... 106/62 |
| 3,441,516 | 4/1969 | Mulligan et al. ..................... 252/512 |
| 3,484,284 | 12/1969 | Dates et al. ....................... 252/514 X |
| 3,682,839 | 8/1972 | Galloway ............................. 252/508 |
| 3,725,091 | 4/1973 | Chyung et al. .................. 29/182.5 X |
| 3,888,796 | 6/1975 | Nigol ..................................... 252/518 |
| 3,948,812 | 4/1976 | Corren et al. .................... 252/518 X |
| 3,982,100 | 9/1976 | Heruert .............................. 252/502 X |

Primary Examiner—Benjamin R. Padgett
Assistant Examiner—E. Suzanne Parr
Attorney, Agent, or Firm—Brisebois & Kruger

[57] ABSTRACT

The electroconductive composite ceramics composed of an independent phase of conglomerates having a particle diameter of at least 20μ and a continuous phase connecting mutually the independent phase of conglomerates. Particularly, electroconductive composite ceramics composed of (A) 50-98% by weight of an independent phase of conglomerates having a particle diameter of at least 20 which consists essentially of a phase of insulating or semiconductive ceramics having a high melting point or a mixture thereof and (B) 50-2% by weight of a continuous phase of an electroconductive substance connecting mutually the independent phase of conglomerates. The electroconductive composite ceramics exhibit stable electroconductivity-temperature characteristics at a temperature of 1000° C or higher and have excellent thermal shock resistance, mechanical strength and chemical resistance.

17 Claims, 2 Drawing Figures

ELECTROCONDUCTIVE COMPOSITE CERAMICS

BACKGROUND OF THE INVENTION

The present invention relates to electroconductive composite ceramics. More particularly, the present invention relates to improved electroconductive composite ceramics which have excellent thermal shock resistance, mechanical strength and chemical resistance property and possess stable electroconductivity-temperature characteristics at a high temperature.

Metals, electroconductive resin composite materials, electroconductive ceramics, electroconductive ceramic composite materials and the like are known hitherto as electroconductive materials. However, these electroconductive materials have drawbacks inherent to themselves. Metals are narrow in a range of selecting specific resistance and poor in heat-resistance. Electro-conductive resin composite materials have such an advantage that the temperature characteristics of specific resistance, thermal shock resistance and mechanical strength can properly be adjusted according to selection of the materials, but their low heat-resistance seriously limits the extent of their application. Electroconductive ceramics are limited in the range of their applicable temperature because of their non-linear electroconductivity to temperature and moreover they are poor in thermal shock resistance and mechanical strength. The thermal shock resistance of electroconductive ceramics can be improved to a certain degree when they are processed to electroconductive ceramic composite materials. However, the electroconductive ceramic composite materials are equivalent to the electroconductive ceramics in respect of low mechanical strength and non-linear electroconductivity to temperature and become narrow in a range of selecting specific resistance than the electroconductive ceramics.

Illustrative of the electroconductive ceramics are ceramics for heater elements such as silicon carbide, zirconia and lanthanum chromite. Illustrative of ceramic materials for thermister are those of MnO—CoO—NiO series utilizable at a low temperature around 200° C, those of $ZrO_2$—$Y_2O_3$ series utilizable at a high temperature around 1000° C and those of spinel series such as $CoAl_2O_4$, $NiAl_2O_4$, $MgAl_2O_4$ and $MgCr_2O_3$. However, these are poor in thermal shock resistance and mechanical strength and undergo oxidation or reduction by the influence of an ambient atmosphere at a high temperature to permit change of resistance value whereby their stability on actual use is badly influenced. Especially, in the case of ceramic materials for high temperature thermistor, they have such a shortcoming that the resistance value is too small, for example, at a temperature as high as 1000° C or more.

Now, it has been found that composite ceramics composed of the conglomerate low thermally expansive ceramics and an electroconductive substance exhibit practically excellent properties and are utilizable in a wide variety of fields.

BRIEF SUMMARY OF THE INVENTION

In accordance with the present invention, there is provided electroconductive composite ceramics composed of (A) 50-98% by weight of an independent phase of conglomerates having a particle diameter of at least 20μ which consists essentially of a phase of insulating or semiconductive ceramics having a high melting point or a mixture thereof and (B) 50-2% by weight of a continuous phase of an electroconductive substance connecting mutually the independent phase of conglomerates.

It is an object of the present invention to provide electroconductive composite ceramics which exhibit stable electroconductivity-temperature characteristics at a temperature of 1000° C or higher.

It is another object of the present invention to provide electroconductive composite ceramics which are excellent in thermal shock resistance.

It is still another object of the present invention to provide electroconductive composite ceramics which are excellent in mechanical strength.

It is a further object of the present invention to provide electroconductive composite ceramics which have excellent in chemical resistance property.

It is still a further object of the present invention to provide electroconductive composite ceramics which are useful as materials for manufacturing high precision temperature-controlling elements for a high temperature range, heater elements for generating controllable high temperatures, precision temperature-controlling elements for a high quality oxidation-resisting or reduction-resisting catalyst, temperature-controlling elements requiring mechanical impact-resistance such as temperature-controlling elements for catalysts for use in automobiles, electrodes for chemical industries such as those for synthetic use by means of electrolytic oxidation, and static charge-eliminating instruments such as sliding guide assemblies for threads and tapes or rotating or sliding parts.

The other objects, features and advantages of the present invention will be apparent from the following description and drawings.

DETAILED DESCRIPTION OF THE INVENTION

The composite ceramics of the present invention have a structure wherein insulating ceramics particles or semiconductive ceramics particles or a mixture thereof are aggregated to form conglomerates having a particle size of at least 20μ and the conglomerates are combined mutually with a continuous phase of an electroconductive substance.

The proportion of the ceramics to the electroconductive substance is not necessarily definite and varies according to the desired properties of the composite ceramics and the sorts and properties of the individual constituents used as starting materials. Usually, however, the ceramics are selected within a range of 50-98% by weight and the electroconductive substance within a range of 2-50% by weight. In view of the fact that the known conventional electroconductive ceramics should be incorporated with at least 30% by weight of an electroconductive substance, it is quite surprising that the composite ceramics of the present invention exhibit satisfactory electroconductivity even in the event that the amount of the electroconductive substance is less than 10% by weight.

In the present invention, it is necessary that the conglomerates of the ceramics should have a particle diameter of at least 20μ. If the particle diameter is less than this value, the effects achieved by forming conglomerates will not fully be displayed. No special limitation exists in the upper limit of the particle diameter. Considering the conditions for preparation and workability, however, the particle diameter is preferably limited to ¼ or less of the thickness of the composite ceramics aimed at. The conglomerates can be prepared by incorporating a given amount of the ceramics particles with a small amount (about 0.5–2% by weight) of a binder such as polyvinyl alcohol, kneading the mixture, shaping it into granules in a usual manner and then drying the granules.

The conglomerates thus prepared may directly be mixed as such with the electroconductive substance or may be sintered preliminarily at a high temperature or shaped into microcapsules and then mixed with the electroconductive substance.

The electroconductive substance of the present invention may be used singly or as a mixture with 20–40% by weight of the ceramics particles.

Mentioned as examples of the method for preparing a phase of the electroconductive substance are a method wherein a solution of the electroconductive substance or a mixture of the solution with the ceramics particles is admixed with conglomerates of the ceramics and then the admixture is sintered and a method wherein a molded article or a sintered porous article of the conglomerates of the ceramics is first formed and then a phase of the desired electroconductive substance is precipitated in vapor phase on the surface of the conglomerates.

According to the present invention, the ceramics used as the component (A) are desirably those having a high melting point for obtaining composite ceramics which are chemically stable and excellent in thermal shock resistance at a high temperature. For example, alumina, magnesia, spinal (an equimolar compound of divalent and trivalent metals), zirconia and the like are especially good ceramics having a high melting point and can be used singly or as a mixture of at least two. Practically, the use of ceramics having a high melting point of at least 1700° C is preferable. In this case, these high melting point ceramics may be incorporated with other metal oxides in an amount up to 20% by weight, so far as the desired high melting point is not depressed. Besides this, low thermally expansive ceramics consisting of one or more of several groups of ceramics such as spodumene, eucryptite, aluminum titanate, cordierite, mullite and zircon may also be used. The low thermally expansive ceramics in this case involve (1) ceramics of spodumene or eucryptite series, i.e. ceramics composed of 30–80% by weight of $SiO_2$, 10–50% by weight of $Al_2O_3$ and/or $Fe_2O_3$ and 0.8–25% by weight of $Li_2O$ and optionally at least one oxide of Na, K, Mg, Ca, Sr, Ba, Cu, Zn, Cr, Mn, Co, Fe, Ni, Sn or Ti, externally added in an amount not exceeding 15% by weight or clay, glass or feldspar externally added in an amount not exceeding 10% by weight for controlling the sintering property of the ceramics; (2) Ceramics of aluminum titanate series, i.e. ceramics composed of 40–75% by weight of $Al_2O_3$ and 25–60% by weight of $TiO_2$ and optionally $Fe_2O_3$ externally added in an amount not exceeding 30% by weight for promoting the formation of the ceramics and one or more oxides of Li, Na, K, Mg, Ca, Sr, Ba, Cu, Zn, Cr, Mn, Co, Ni, Zn or Si or clay, glass or feldspar externally added in an amount not exceeding 10% by weight for controlling the sintering property of the ceramics; (3) ceramics of cordierite series, i.e. ceramics composed of 80% by weight of a total of MgO, $Al_2O_3$ and $SiO_2$ with the proviso that the proportion of the three components, MgO, $Al_2O_3$ and $SiO_2$ in terms of the co-ordinates system is within an extent surrounded by the line connecting the six points (2, 33, 65), (2,53, 45), (20, 15, 65), (10, 55, 35), (30, 15, 55) and (30, 35, 35), and optionally clay, glass or feldspar externally added in an amount not exceeding 10% by weight or one or more oxides of Sn, Ti and Zr externally added in an amount not exceeding 25% by weight; (4) Ceramics of mullite series, i.e. ceramics composed of 40–70% by weight of $Al_2O_3$, 25–55% by weight of at least one oxide selected from $SiO_2$ and $TiO_2$ and at least one oxide selected from oxides of Cr, Mn, Fe, Ca and Ni or clay, glass or feldspar in an amount not exceeding 25% by weight; (5) Ceramics of zircon series, i.e. ceramics composed of at least 70% by weight of zircon ($ZrO_2.SiO_2$), at most 30% by weight of $SiO_2$ and at least 10% by weight of $ZrO_2$, and optionally a silicate of at least one trivalent metal selected from Fe and Cr in an amount not exceeding 18% by weight, a silicate of at least one divalent metal selected from Co, Ni, Mn and alkaline earth metals in an amount not exceeding 15% by weight or clay, glass or feldspar in an amount not exceeding 10% by weight.

These high melting point ceramics or low thermally expansive ceramics as the component (A) may be incorporated, if desired, with metal oxides of perovskite or spinel series referred to hereinafter, within such an extent that chemical stability and high degrees of thermal shock resistance and mechanical strength at a high temperature are maintained.

Utilizable as the component (B) of the present invention are electroconductive substances such as metals, carbon, cermet, nitrides, borides, carbides or silicides of metals, metal oxides or a mixture of these substances. Examples of the metals include silver, titanium and nichrome. Examples of the cermets include titanium carbide-chromium. Examples of the metal nitrides include titanium nitride and aluminum nitride. Examples of the metal borides include titanium boride and zirconium boride. Examples of the metal carbides include silicon carbide and zirconium carbide. Examples of the metal silicides include molybdenum disilicide. Examples of the metal oxides include as the first group those of perovskite or spinel series, i.e. a composition consisting of 12–70% by weight of a divalent metal oxide and 88–30% by weight of a trivalent metal oxide and optionally silicon dioxide, tin oxide or zirconium oxide externally added in an amount up to 50% by weight or one or more oxides of titanium, molybdenum, tungsten, manganese, vanadium and lanthanoids such as lanthanum externally added in an amount up to 3% by weight. The above mentioned divalent metal oxide is at least one metal oxide selected from magnesium oxide, nickel oxide, zinc oxide and cobalt oxide, which, if desired, may be substituted in an amount up to ½ of its weight by at least one metal oxide selected from beryllium oxide, calcium oxide, strontium oxide, barium oxide and ferrous oxide. The above mentioned trivalent metal oxide is aluminum oxide which may contain chromium oxide and/or ferric oxide in an amount up to 9/10 of the weight of the aluminum oxide. The second group of the metal oxides used as the component (B) in the composite ceramics of the present invention has a composition consisting of 30–97.5% by weight of zirconium oxide and 70–2.5% by weight of at least one metal oxide selected from calcium oxide, scandium oxide, yttrium oxide, neodymium oxide, ytterbium oxide and thorium oxide. The metal oxides may be incorporated with at least one metal oxide additive selected from oxides of beryllium, magnesium, strontium, barium, zinc, iron, cobalt, nickel, aluminum, titanium, lanthanum, cerium, chromium, molybdenum and tungsten, in such an amount that the electroconductivity of the ceramics is not deteriorated or up to 3% weight of component (B), for improving the sintering property of the ceramics.

The electroconductive composite ceramics of the present invention should have a structure wherein the component (A) is in the form of an independent phase of conglomerates having a particle diameter of at least 20μ and the component (B) is in the form of a continuous phase connecting mutually the independent phase of conglomerates.

The smaller the diameter of the independent phase of conglomerates, the more is the component (B) affected by diffusion of the component (B), thus resulting in shortening of life at a high temperature. When the average particle diameter is smaller than 20μ, this tendency becomes so significant that troubles may occur in practical use.

When the amount of the component (A) in the composite ceramics of this invention is increased, the thermal impact resistance and mechanical strength are improved and the life at a high temperature is prolonged. If the amount exceeds 98% by weight, however, the resistance at a high temperaure will become too large to be practical. On the other hand, if the amount becomes less than 50% by weight, the life of the composite ceramics at a high temperature will significantly be shortened.

The proportion of the component (B) previously defined is a preferable range within which the ceramics exhibit electroconductivity at high temperature. Outside this range, drawbacks are realized such as increase in resistance at a high temperature or decrease in B constant.

The main function of the component (A) in composite ceramics of this invention is to maintain stability at a high temperature by maintaining thermal shock resistance and mechanical strength during the use of the ceramics and protecting the component (B) from the oxidizing and reducing actions of the ambinent gaseous atmosphere at a high temperature. On the other hand, the main function of the component (B) is to afford electroconductivity at a high temperature. The composite ceramics of the present invention could overcome for the first time the drawbacks of the known conventional high temperature ceramics by taking advantage of the synergistic effect of the components (A) and (B). By proper selection of the component (A) in the composite ceramics of the present invention, it is possible to obtain ceramics which can withstand repeated instantaneously rapid heating and cooling between ordinary temperature and 1000° C or those which have a high bending strength of several thousand kilograms per square centimeters. Such properties are imparted by the properties of the independent phase of the component (A) which is a matrix. Especially, a high mechanical strength can be obtained as in the latter case, because the component (B) having a sintering temperature and a thermal expansion curve similar to those of the component (A) is present as a continuous phase in the composite ceramics. As the component (A) which forms the independent phase is intimately connected to the component (B) which forms the continuous phase, compact sintering of the ceramics can be achieved with the result that the component (B) is protected from oxidation and reduction by the ambient gaseous atmosphere at a high temperature. The resistance characteristics of the composite ceramics of the present invention are afforded by the continuous phase of the component (B) below a certain temperature but, on the contrary, they are afforded by the component (A) above that temperature. Therefore, selection of the component (A) is very important. Preferable components (A) are those which should naturally be excellent in heat-resistance and chemicals-resisting property, which are free of any transformation in the process of elevating the temperature from normal temperature to a high temperature and permit, if necessary, internal diffusion of a part of the component (B) and which make themselves to serve as a resistance element at a high temperature. Examples of such component (A) include alumina, magnesia, spinal and zirconia among the high melting point ceramics and spodumene, eucryptite, aluminum titanate, cordierite, mullite and zircon among the low thermally expansive ceramics.

The resistance value of the electroconductive composite ceramics of the present invention can be controlled rather freely by varying the ratio of the component (A) to the component (B) within a given range. Therefore, the composite ceramics can maintain a high resistance value even at a high temperature around 1000° C, thus bringing about a practical advantage. The known conventional electroconductive ceramics show non-linear electroconductivity characteristics against temperature, and highly negative electroconductivity-temperature characteristics within a temperature range up to several hundred degrees. On the contrary, the composite ceramics of the present invention can be furnished with linear or non-linear and positive or negative temperature characteristics by appropriate selection of the sorts of the two components and the mixing ratio between them. As the composite ceramics can easily be furnished with a desired electroconductivity, a wide range of temperatures can be used. In addition, the composite ceramics are very convenient in that they can be processed to a safe heater element of which temperature is easily controllable and they can be manufactured in desired shape and size.

By properly selecting the component (A), the composite ceramics of the present invention can be furnished with chemical characteristics desirable for the intended purpose. For example, the ceramics chemically stable at a high temperature can be produced by selecting for the component (A) zirconia or zircon when acidic substances such as zirconium oxide, silicon dioxide or titanium dioxide are selected as oxides of tetravalent metals for the component (B) and selecting magnesia for the component (A) when basic substances such as oxides of alkaline earth metals are chosen for the component (B). For the purposes where mechanical strength is important, alumina is suitably selected for the component (A). Selection of spinel is also appropriate if an oxide of perovskite or spinel series is used for the component (B). For the purposes where thermal shock resistance is important, low thermally expansive ceramics such as those of spodumene, eucryptite, aluminum titanate, cordierite, mullite or zircon series are preferably selected for the component (A). In all the cases mentioned above, compactness of the ceramics is a prerequisite. If any trouble occurs in binding of the components (A) and (B) by sintering, the component (A) may be incorporated with various additives or the ceramics of perovskite or spinel series. The specific resistance of the component (A) itself changes at a high temperature. Particularly, when a part of the component (B) has diffused into the independent phase of the component (A), influence of the component (A) upon the resistance becomes distinct above a certain temperature. Hence, it is possible to produce the composite ceramics with unique temperature characteristics by properly selecting a combination of the components (A) and (B).

In the manufacture of the composite ceramics of the present invention, conglomerates having a particle diameter of at least $20\mu$, preferably between 0.1mm and 1.00mm, are first prepared from the powder of the component (A).

Separately, one or more metal oxides necessary to form the component (B) or a starting material capable of being converted by sintering into the desired metal oxides such carbonates are mixed, calcined and pulverized again.

The powder prepared in this manner, are mixed with the previously mentioned conglomerates in a given ratio and a small amount of a binder such as polyvinyl alcohol, denatured starch or carboxymethyl cellulose is added. The mixture is shaped into a desired form and sintered at 500°–2000° C for 5–100 hours. The desired high temperature composite ceramics are thus manufactured.

The composite ceramics of the present invention are advantageous in that they excel in thermal shock resistance, mechanical strength and impact resistance in comparison with the known conventional ones, that they are stable to oxidation and reduction by ambient atmosphere at a high temperature, that change in the resistance value is little during use and that a satisfactory resistance value can be maintained even at a high temperature above 1000° C. By appropriate selection of the components (A) and (B), various types of ceramics suitable for a specific purpose such as those stable at a high temperature above 1500° C, those stable in acidic or basic atmosphere at a high temperature, those with specific temperature characteristics or those with high thermal shock resistance can be prepared.

Therefore, the composite ceramics of the present invention can remarkably broaden the field of utilizing ceramics which has hitherto been limited. For example, they can be used widely as materials for manufacturing high precision temperature conttrolling elements for a high temperature range, heater elements for generating controllable high temperatures, precision temperature-controlling elements for a high quality oxidation-resisting or reduction-resisting catalyst, temperature-controlling elements requiring mechanical impact-resistance such as temperature-controlling elements for catalysts for use in automobiles, and the like.

This invention will now be explained in more detail by way of examples. It is to be noted, however, that these examples are given only for the purpose of illustration and not for limiting the scope of the invention.

EXAMPLE 1

A mixture of finely pulverized alumina powder and 2% by weight of titanium oxide was incorporated with polyvinyl alcohol and then shaped into conglomerates as the component (A) of the composite ceramics. Conglomerates of several different sizes were prepared. To these conglomerates were added silver powder as an electroconductive substance of the component (B) and 1% by weight of clay. The mixture was thoroughly mixed, molded after addition of 1% by weight of polyvinyl alcohol as a molding binder and sintered at 950°–1000° C. Properties of the sintered ceramics were as will be shown hereinafter. A result of examinations on the properties is shown graphically in FIGS. 1 and 2.

Figure 1:
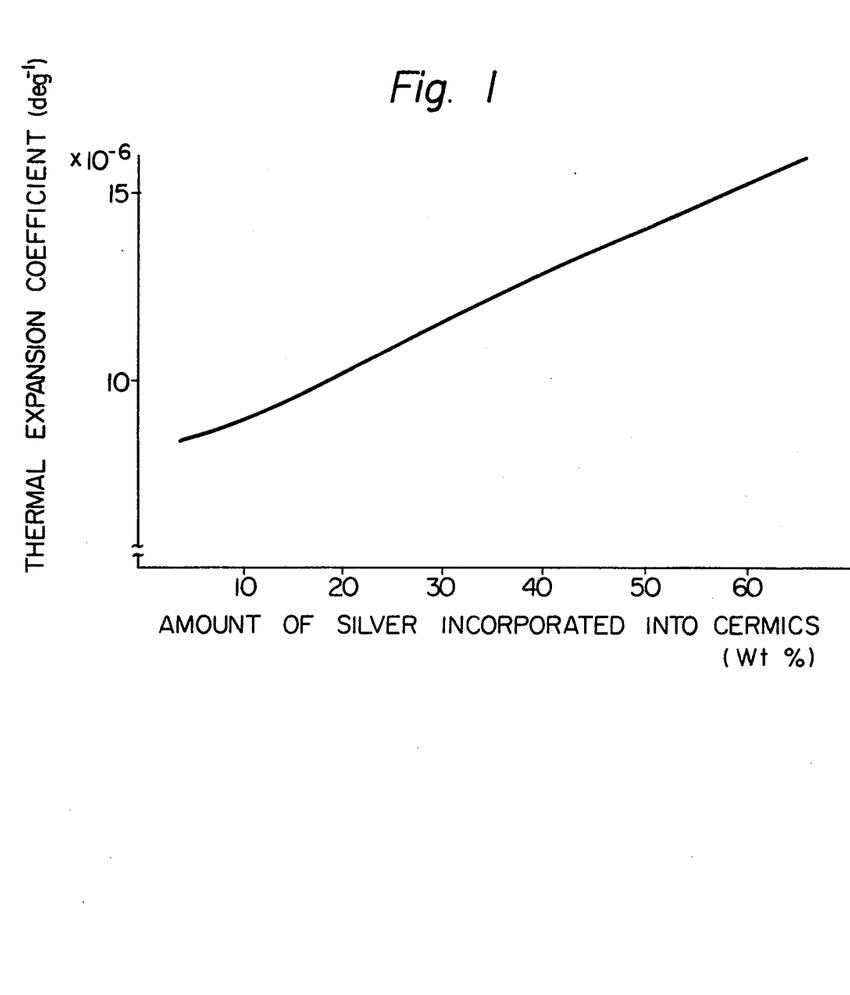
FIG. 1 is a graph showing the relation between the quantity of silver incorporated and the thermal expansion coefficient in Examples of the present invention.
Figure 2:
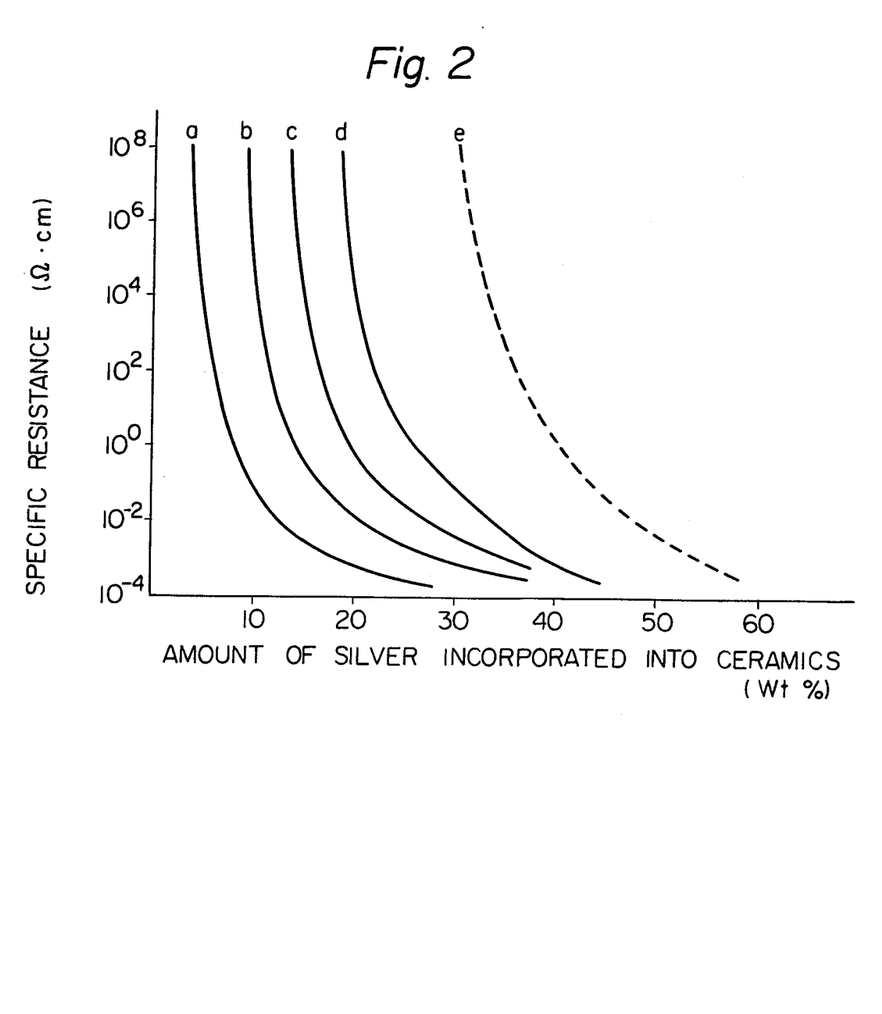
FIG. 2 is a graph showing the relation between the quantity of silver incorporated and the specific resistance.

FIG. 1 is a graph showing the change in thermal expansion coefficient by varying the content (% by weight) of the silver powder. FIG. 2 is a graph showing the relation between the content of the silver powder and the specific resistance when the conglomerates having particle diameters of (a) 0.2–0.5mm (average 0.3mm), (b) 0.1–0.2mm (average 0.15mm), (c) 0.04–0.1mm (average 0.07mm), and (d) 0.015–0.07mm (average 0.03mm) were used. A broken line (e) in FIG. 2 shows a datum obtained by the known conventional dispersion mixing method in which the ceramic particles which are not conglomerated (smaller than 0.003mm) are used.

It is evident from FIG. 1 that, by increasing the amount of silver as an electroconductive substance, thermal expansion coefficient of the composite ceramics is proportionally increased.

Curves in FIG. 2 show that specific resistance is exponentially decreased by increasing the amount of silver. The graph also shows a remarkable difference in specific resistance between the ceramics conglomerated and those not conglomerated. In comparison of the specific resistance value in each curve with the case of the amount of silver being 30% by weight, it is noted that the value becomes indefinitely large when the component (A) is not conglomerated but the value is smaller than 1 $\Omega$·cm in this instance when the component (A) is conglomerated. It is also shown that the specific resistance generally decreases by increasing the particle diameter. Therefore, to obtain good electroconductive composite ceramics with a small amount of the electroconductive substance, the component (A) is desirably conglomerated above a certain size.

In this example, temperature characteristics of the specific resistance of the composite ceramics containing 10% by weight of the conglomerates with a particle diameter of 0.2–0.5mm was $4.2 \times 10^{-4}$/deg..

Composite ceramics prepared by conglomerating a mixture of alumina and 2% by weight of titanium oxide, sintering the conglomerates at 950° C. and adding, silver powder to the sintered conglomerates in the same manner as described above were also similar in their properties.

EXAMPLE 2

Properties of the ceramics prepared by replacing silver used in Example 1 with other electroconductive substances were as shown in Table 1. The diameter used was 0.2–0.5mm.

Table 1

| Sample | Electroconductive substance sort | Quantity mixed (% by wt.) | Baking condition Sintering temperature (° C) | Atmosphere | Characteristics of the composite ceramics Thermal expansion coefficient ($\times 10^{-6}$/deg) | Specific resistance ($\Omega \cdot$ cm) |
|---|---|---|---|---|---|---|
| 1 | TiN | 25 | 1450–1550 | $N_2$ | 9.2 | $2.3 \times 10$ |
| 2 | SiC | 25 | 1450–1550 | $N_2$ | 6.4 | 1.8 |
| 3 | C | 30 | 1450–1550 | $N_2$ | 7.1 | $4.3 \times 10$ |
| 4 | $MoSi_2$ | 25 | 1550–1600 | vacuum | 8.4 | $5.3 \times 10^{-3}$ |

It is evident that all of the electroconductive substances afford composite ceramics with a low thermal expansion coefficient. In view of the specific resistance values shown in the table, good electroconductive ceramics are produced in all of the cases, with the best result being obtained for electroconductivity in the case of using $MoSi_2$.

EXAMPLE 3

Conglomerates of the ceramics in Example 1 having a particle diameter of 0.2–0.5mm were prepared. Separately, a homogeneous mixture of 30% by weight of the same ceramics powder and 70% by weight of $MoSi_2$ as an electroconductive substance was prepared. The former conglomerates (A) were thoroughly mixed with the latter mixed 70% electroconductive substance (B) and 1% by weight of a clay and then incorporated with 1% by weight of polyvinyl alcohol as a binder for molding. The mixture was molded and sinteres at 1550°–1600° C. under vacuum. Properties of the sintered ceramics were as shown in Table 2.

Table 2

| Sample No. | Mixing ratio (A) (wt. %) | Mixing ratio (B) (wt. %) | Content of $MoSi_2$ (wt. %) | Thermal expansion coefficient ($\times 10^{-6}$/deg.) | Specific resistance ($\Omega$ . cm) | Bending strength (Kg/$cm^2$) |
|---|---|---|---|---|---|---|
| 1 | 50 | 50 | 35 | 8.5 | $2 \times 10^{-3}$ | 2850 |
| 2 | 70 | 30 | 21 | 8.3 | $8 \times 10^{-3}$ | 2730 |
| 3 | 85 | 15 | 10.5 | 8.2 | $2 \times 10^{-2}$ | 3340 |
| 4 | 90 | 10 | 7 | 8.0 | $7 \times 10^{-1}$ | 3710 |

From the results listed in table 2, it is evident that the composite ceramics with the above compositions excel in thermal expansion-resistance, electroconductivity and bending strength. For enhancing electroconductivity, increase in the content of $MoSi_2$ is desired but such increase will cause undesirable deterioration of bending strength. It is desirable, therefore to adjust the content of $MoSi_2$ properly according to the intended purpose of the ceramics.

EXAMPLE 4

Conglomerates of 0.2–0.5mm in diameter were prepared from various kinds of pulverized ceramics and mixed well with 10% by weight of silver powder as an electroconductive substance and 2% by weight of a clay. The mixture was molded after addition of polyvinyl alcohol as a binder for molding and sintered at 950–1000° C. Properties of the sintered ceramics were as shown in Table 3.

Table 3

| Sample No. | Ceramics used for conglomeration | Thermal expansion coefficient ($\times 10^{-6}$/deg.) | Specific resistance ($\Omega$ . cm) |
|---|---|---|---|
| 1 | Forsterite | 9.3 | $24 \times 10$ |
| 2 | A mixture of 45% by weight of pottery stone, 30% by weight of clay, 20% by weight of feldspar and 5% by weight of silicate rock | 7.2 | $4.3 \times 10^2$ |
| 3 | Cordierite | 4.1 | $8.4 \times 10$ |
| 4 | Calcium titanate semiconductor | 8.9 | 6.5 |
| 5 | Barium titanate semiconductor contain 15% by weight of alumina | 9.7 | $9.8 \times 10^{-1}$ |

The above table obviously shows that these conglomerated ceramics afford practically useful compsite ceramics.

EXAMPLE 5

Using the starting materials, mixing ratios and sintering temperatures shown in Table 4, various composite ceramics were prepared.

Given amounts of respective materials of the component (B) listed in Table 4 were mixed, ground together with ethanol in a small ball mill, dried and calcined at 1200°–1400° C. The calcined mixture was pulverized in an agate mortar until the powder passed through a 200 mesh sieve, again ground together with ethanol in a small ball mill, incorporated with the conglomerates of the component (A) having a particle diameter within a range of 0.1–0.35mm in a given ratio, thoroughly mixed for 10 minutes and then dried.

The mixture was then incorporated with 1% by weight of polyvinyl alcohol as a binder, charged into a special metal mold capable of forming a cylindrical column of 4mm is external diameter and 10mm in length with two platinum wires having a diameter of 0.4mm embedded on one bottom of the column, and molded under a molding pressure of about one ton/$cm^2$.

Next, these samples were sintered at temperatures listed in Table 4. In the case of Samples Nos. 12–14, the samples were aged at 1250° or 1000° C. for about 100 hours before measurement of the thermistor characteristics at high temperatures. This measurement was attained by measuring the resistance up to 1450° or 1200° C. and calculating B constant from resistance values at 700° and 1250° or 1100° C.

Next, the samples were allowed to stand, while continuously sending thereto 6V direct current, in air at 1250° or 1000° C. or in nitrogen at 1200° or 1000° C. to measure change in the resistance value with the lapse of time.

For measurement of bending strength, the smaples shaped under the same conditions as described above into a square pillar of 2×2×30mm in size were used.

The results of these measurements are shown in Table 5.

Table 4

| Sample No. | The component (A) | (% by weight) | The component (B) (% by weight) | | Additive (% by weight externally added) | Mixing ratio of the components (A) & (B) (% by weight) | | Sintering temperature (° C) |
|---|---|---|---|---|---|---|---|---|
| | | | Oxides of divalent metals | Oxides of trivalent metals | | (A) | (B) | |
| 1 | $Al_2O_3$ | 90 | MgO 23.5 | $Al_2O_3$ 32 | | | | |
| | $MgAl_2O_3$ | 10 | NiO 2.5 | $Cr_2O_3$ 42 | — | 50 | 50 | 1680 |
| 2 | $Al_2O_3$ | 85 | MgO 23.5 | $Al_2O_3$ 32 | | | | |
| | $MgAl_2O_4$ | 15 | NiO 2.5 | $Cr_2O_3$ 42 | — | 70 | 30 | 1700 |
| 3 | $Al_2O_3$ | 90 | MgO 23.5 | $Al_2O_3$ 32 | | | | |
| | $MgAl_2O_4$ | 10 | NiO 2.5 | $Cr_2O_3$ 42 | — | 90 | 10 | 1700 |
| 4 | $Al_2O_3$ | 90 | MgO 23.5 | $Al_2O_3$ 32 | | | | |
| | $MgAl_2O_4$ | 10 | NiO 2.5 | $Cr_2O_3$ 42 | — | 95 | 5 | 1700 |
| 5 | $Al_2O_3$ | 88 | MgO 23.5 | $Al_2O_3$ 32 | | | | |
| | $MgAl_2O_4$ | 12 | NiO 2.5 | $Cr_2O_3$ 42 | — | 97.5 | 2.5 | 1700 |
| 6 | MgO | 12 | MgO 23.5 | $Al_2O_3$ 32 | | | | |
| | $MgAl_2O_4$ | 88 | NiO 2.5 | $Cr_2O_3$ 42 | — | 90 | 10 | 1700 |
| 7 | $MgAl_2O_4$ | 98 | MgO 23.5 | $Al_2O_3$ 32 | | | | |
| | $NiAl_2O_4$ | 2 | NiO 2.5 | $Cr_2O_3$ 42 | — | 92 | 8 | 1700 |
| 8 | $Al_6Si_2O_{13}$ | 100 | MgO 23.5 | $Al_2O_3$ 32 | | | | |
| | | | NiO 2.5 | $Cr_2O_3$ 42 | $SiO_2$ 0.2 | 90 | 10 | 1650 |
| 9 | $ZrSiO_4$ | 55 | MgO 23.5 | $Al_2O_3$ 32 | $SiO_2$ 0.2 | | | |
| | $Al_2O_3$ | 45 | NiO 2.5 | $Cr_2O_3$ 42 | $ZrO_2$ 25 | 90 | 10 | 1600 |
| 10 | $ZrO_2$ | 50 | MgO 23.5 | $Al_2O_3$ 32 | | | | |
| | $SiO_2$ | 10 | NiO 2.5 | $Cr_2O_3$ 42 | — | 90 | 10 | 1600 |
| | $MgAl_2O_4$ | 40 | | | | | | |
| 11 | $Al_6Si_2O_{13}$ | 80 | MgO 23.5 | $Al_2O_3$ 32 | | | | |
| | $Al_2O_3$ | 5 | NiO 2.5 | $Cr_2O_3$ 42 | — | 90 | 10 | 1670 |
| | $SiO_2$ | 15 | | | | | | |
| 12 | $Mg_2Al_4Si_5O_{18}$ | 85 | MgO 23.5 | $Al_2O_3$ 32 | | | | |
| | $SiO_2$ | 10 | NiO 2.5 | $Cr_2O_3$ 42 | — | 90 | 10 | 1440 |
| | $MgAl_2O_4$ | 5 | | | | | | |
| 13 | $LiAlSi_2O_6$ | 90 | MgO 23.5 | $Al_2O_3$ 32 | | | | |
| | $MgAl_2O_4$ | 10 | NiO 2.5 | $Cr_2O_3$ 42 | — | 90 | 10 | 1380 |
| 14 | $LiAlSiO_4$ | 90 | MgO 23.5 | $Al_2O_3$ 32 | | | | |
| | $MgAl_2O_4$ | 10 | NiO 2.5 | $Cr_2O_3$ 42 | — | 90 | 10 | 1340 |
| 15 | $Al_2TiO_5$ | 50 | MgO 23.5 | $Al_2O_3$ 32 | | | | |
| | $Al_6Si_2O_{13}$ | 45 | NiO 2.5 | $Cr_2O_3$ 42 | — | 90 | 10 | 1520 |
| | MgO | 5 | | | | | | |
| 16 | $Al_2O_3$ | 80 | MgO 23.5 | $Al_2O_3$ 32 | | | | |
| | $SiO_2$ | 20 | NiO 2.5 | $Cr_2O_3$ 42 | — | 90 | 10 | 1620 |
| 17 | $Al_2O_3$ | 85 | MgO 23.5 | $Al_2O_3$ 32 | | | | |
| | $TiO_2$ | 15 | Nio 2.5 | $Cr_2O_3$ 42 | — | 90 | 10 | 1630 |
| 18 | $ZrSiO_4$ | 50 | MgO 23.5 | $Al_2O_3$ 32 | | | | |

Table 4-continued

| Sample No. | The component (A) (% by weight) | | The component (B) (% by weight) | | Additive (% by weight externally added) | Mixing ratio of the components (A) & (B) (% by weight) | | Sintering temperature (°C) |
|---|---|---|---|---|---|---|---|---|
| | | | Oxides of divalent metals | Oxides of trivalent metals | | (A) | (B) | |
| 19 | Al$_2$O$_3$<br>SiO$_2$ | 30<br>20 | NiO<br>2.5 | Cr$_2$O$_3$<br>42<br>Al$_2$O$_3$<br>9 | — | 90 | 10 | 1570 |
| 20 | Al$_2$O$_3$ | 100 | NiO<br>34 | Cr$_2$O$_3$<br>42<br>Fe$_2$O$_3$<br>15 | — | 90 | 10 | 1680 |
| 21 | MgO<br>MgAl$_2$O$_4$ | 2<br>98 | MgO<br>0.5<br>NiO<br>45<br>CaO<br>19 | Al$_2$O$_3$<br>35.5 | SiO$_2$<br>20<br>SnO$_2$<br>20 | 92 | 8 | 1700 |
| 22 | Al$_2$O$_3$ | 100 | MgO<br>0.5<br>CaO<br>4<br>CoO<br>40.5 | Al$_2$O$_3$<br>55 | SiO$_2$<br>5 | 90 | 10 | 1700 |
| 23 | Al$_2$O$_3$ | 100 | MgO<br>8<br>CaO<br>4<br>SrO<br>3 | Al$_2$O$_3$<br>35<br>Cr$_2$O$_3$<br>50 | SiO$_2$<br>10 | 90 | 10 | 1610 |
| 24 | Al$_2$O$_3$ | 100 | MgO<br>10<br>CaO<br>5<br>BaO<br>2 | Al$_2$O$_3$<br>33<br>Cr$_2$O$_3$<br>50 | SiO$_2$<br>10 | 90 | 10 | 1600 |
| 25 | Al$_2$O$_3$ | 100 | MgO<br>2.0<br>NiO<br>2.5<br>ZnO<br>3.5 | Al$_2$O$_3$<br>32<br>Cr$_2$O$_3$<br>42 | — | 90 | 10 | 1650 |
| 26 | Al$_2$O$_3$ | 100 | NiO<br>45<br>CaO<br>19 | Al$_2$O$_3$<br>36 | MnO$_2$<br>2.7<br>TiO$_2$<br>2.2 | 90 | 10 | 1660 |
| 27 | Al$_2$O$_3$ | 100 | MgO<br>23.5<br>NiO<br>2.5 | Al$_2$O$_3$<br>32<br>Cr$_2$O$_3$<br>42 | La$_2$O$_3$<br>0.5<br>V$_2$O$_3$<br>0.1 | 90 | 10 | 1620 |
| 27 | Al$_2$O$_3$<br>ZrO$_2$ | 90<br>10 | ZrO$_2$<br>83<br>Y$_2$O$_3$<br>17 | — | — | 80 | 20 | 1700 |
| 28 | Al$_2$O$_3$<br>ZrO$_2$ | 90<br>10 | ZrO$_2$<br>95<br>CaO<br>5 | — | — | 80 | 20 | 1650 |
| 29 | Al$_2$O$_3$<br>ZrO$_2$ | 90<br>10 | ZrO$_2$<br>83<br>Y$_2$O$_3$<br>15<br>CaO<br>2 | — | — | 80 | 20 | 1680 |
| 30 | Al$_2$O$_3$<br>ZrO$_2$ | 80<br>20 | ZrO$_2$<br>67 | Nd$_2$O$_3$<br>23 | — | 85 | 15 | 1700 |
| 31 | ZrO$_2$ | 100 | ZrO$_2$<br>64 | Yb$_2$O$_3$<br>36 | — | 85 | 15 | 1700 |
| 32 | ZrO$_2$ | 100 | ZrO$_2$<br>89 | Sc$_2$O$_3$<br>11 | — | 80 | 20 | 1720 |

Table 5

| Sample No. | Bending strength (Kg/cm²) | Resistance at 700° C (Ω) | B constant | Change in resistance after being boaded for 1000 hours at high temperature (%) | |
|---|---|---|---|---|---|
| | | | | In air | In nitrogen |
| 1 | 2020 | $3.2 \times 10^3$ | 14000 | +8.3 | +10.0 |
| 2 | 2310 | $7.4 \times 10^2$ | 14400 | +3.8 | +6.2 |
| 3 | 2800 | $2.1 \times 10^3$ | 12800 | +4.3 | +3.8 |
| 4 | 2740 | $1.2 \times 10^4$ | 13500 | +2.4 | +4.0 |
| 5 | 2680 | $4.3 \times 10^5$ | 14100 | +2.8 | +2.8 |
| 6 | 1910 | $4.8 \times 10^3$ | 12500 | +3.4 | +4.2 |
| 7 | 1780 | $2.4 \times 10^3$ | 13300 | +1.5 | +1.2 |
| 8 | 1580 | $3.6 \times 10^4$ | 7800 | +4.7 | +6.7 |
| 9 | 1630 | $9.2 \times 10^5$ | 4100 | +6.3 | +7.4 |
| 10 | 1420 | $2.4 \times 10^4$ | 6200 | +9.3 | +8.7 |
| 11 | 1840 | $8.3 \times 10^4$ | 5400 | +6.8 | +9.2 |
| 12 | 1100 | $4.7 \times 10^3$ | 11500 | +4.2 | +6.1 |
| 13 | 1020 | $1.1 \times 10^4$ | 12100 | +8.4 | +8.2 |
| 14 | 980 | $6.7 \times 10^3$ | 11500 | +7.5 | 7.4 |
| 15 | 620 | $9.5 \times 10^4$ | 9200 | +8.1 | +8.9 |
| 16 | 2400 | $2.8 \times 10^3$ | 10200 | +10.0 | +10.0 |
| 17 | 2510 | $1.8 \times 10^3$ | 12100 | +8.6 | +9.8 |
| 18 | 1550 | $1.5 \times 10^6$ | 7400 | +8.4 | +9.8 |
| 19 | 2020 | $3.2 \times 10^3$ | 14000 | +8.3 | +10.0 |
| 20 | 1750 | $9.2 \times 10^3$ | 12500 | +8.4 | +6.1 |
| 21 | 2730 | $8.3 \times 10^3$ | 8800 | +4.0 | +6.2 |
| 22 | 2220 | $1.4 \times 10^3$ | 6600 | +5.8 | +3.0 |
| 23 | 2310 | $4.4 \times 10^3$ | 7100 | +6.8 | +2.8 |
| 24 | 2780 | $8.3 \times 10^2$ | 11500 | +2.1 | +2.4 |
| 25 | 2720 | $2.1 \times 10^4$ | 9400 | +4.5 | +3.8 |
| 26 | 2410 | $1.1 \times 10^3$ | 9800 | +3.3 | +1.7 |
| 27 | 2310 | $6.4 \times 10^3$ | 14000 | +3.2 | +3.0 |
| 28 | 2440 | $8.0 \times 10^3$ | 15100 | +4.8 | +5.0 |
| 29 | 2350 | $7.2 \times 10^3$ | 17200 | +3.0 | +4.4 |
| 30 | 2380 | $8.0 \times 10^4$ | 13600 | +8.0 | +10.0 |
| 31 | 2240 | $8.0 \times 10^4$ | 18400 | +7.6 | +8.4 |
| 32 | 2050 | $4.0 \times 10^3$ | 12800 | +6.3 | +9.1 |

The results in the above table obviously show that the composite ceramics prepared under the conditions listed in Table 4 exhibit good electric resistance even at a high temperature of 700° C. and minor change in resistance even after being electrically loaded at high temperature. The bending strength of these composite ceramics was generally significantly large.

EXAMPLE 6

Alumina of 0.04–0.2mm in particle diameter was used as the component (A) and a spinel composed of 23.5% by weight of MgO, 2.5% by weight of NiO, 32% by weight of $Al_2O_3$ and 42% by weight of $Cr_2O_3$ as the component (B). The components (A) and (B) were mixed in a weight ratio of 90:10 and sintered at 1700° C. in the same manner as described in Example 5 to prepare compsite ceramics. The properties of the resultant sample were examined in the same manner as described in Example 5 and a result thereof is shown in Table 6 as Sample (I).

Separately, composite ceramics were prepared in exactly the same manner as described above except that alumina of 0.015–0.1mm in particle diameter was used as the component (A). The properties of this sample was also examined in the same manner as described above and a result thereof is also shown in Table 6 as Sample (II).

Table 6

| Sample No. | Bending strength (Kg/cm²) | Resistance at 700° C (Ω) | B constant | Change in resistance after being loaded for 1000 hours at high temperature (%) | |
|---|---|---|---|---|---|
| | | | | In air | In nitrogen |
| (I) | 2750 | $6.8 \times 10^3$ | 13200 | +2.3 | +1.4 |
| (II) | 2820 | $8.6 \times 10^2$ | 14000 | +7.6 | +8.4 |

The table obviously shows that both samples exhibited good electric resistances and these resistance values are little in change. Further, these samples possess very high bending strength.

EXAMPLE 7

Thermal expansion coefficients of the samples Nos. 4, 8, 9, 12 and 13 prepared in Example 5 were measured and a result of the measurement is shown in Table 7.

Table 7

| Sample No. | Thermal expansion coefficient ($\times 10^{-6}$/deg.) |
|---|---|
| 4 | 8.1 |
| 8 | 4.4 |
| 9 | 5.8 |
| 12 | 3.2 |
| 13 | 1.8 |

All the samples showed low thermal expansion coefficients.

As obviously shown in Examples 1–7, the composite ceramics of the present invention exhibit stable electroconductivity-temperature characteristics and are excellent in such properties as thermal shock resistance and mechanical strength.

We claim:

1. Electroconductive composite ceramics composed of (A) 50–98% by weight of an independent phase which is conglomerates having a particle diameter of at least 20μ and consisting essentially of insulating or semiconductive ceramics having a high melting point or a mixture thereof selected from the group consisting of alumina, magnesia, spinel and zirconia and (B) 50–2% by weight of a continuous phase which is at least one electroconductive substance and connects said independent phase mutually selected from the group consisting of metals, carbon, cermets, nitrides, borides, carbides and silicides of metals, and metal oxides.

2. Electroconductive composite ceramics of claim 1 wherein ceramics of said component (A) is a combination of at least one high melting point ceramics selected from the group consisting of alumina, magnesia and zirconia and at least one ceramics selected from those of perovskite series and those of spinel series.

3. Electroconductive composite ceramics of claim 1 wherein ceramics of said component (A) is selected from high melting point ceramics containing at least 80% of at least one compound selected from the group consisting of alumina, magnesia, spinel and zirconia.

4. Electroconductive composite ceramics of claim 1 wherein ceramics of said component (A) is a combination of high melting point ceramics containing at least 80% of at least one compound selected from the group consisting of alumina, magnesia and zirconia and at least one ceramics selected from those of perovskite series and those of spinel series.

5. Electroconductive composite ceramics of claim 1 wherein ceramics of said component (A) is at least one low thermally expensive ceramics selected from the group consisting of those of spodumene series, those of eucryptite series, those of aluminum titanate series, those of cordierite series, those of mullite series and those of zircon series.

6. Electroconductive composite ceramics of claim 1 wherein ceramics of said component (A) is a combination of at least one low thermally expansive ceramics selected from the group consisting of those of spodumene series, those of eucryptite series, those of aluminum titanate series, those of cordierite series, those of mullite series and those of zircon series and at least one ceramics selected from the group consisting of those of perovskite series and those of spinel series.

7. Electroconductive composite ceramics of claim 1 wherein said component (B) is at least one metal oxide.

8. Electroconductive composite ceramics of claim 7 wherein said component (B) is metal oxides composed of (a) 12–70% by weight of at least one metal oxide selected from magnesium oxide, nickel oxide, zinc oxide and cobalt oxide and (b) 88–30% by weight of aluminum oxide.

9. Electroconductive composite ceramics of claim 8 wherein said component (a) is substituted by at least one metal oxide selected from the group consisting of beryllium oxide, calcium oxide, strontium oxide, barium oxide and ferrous oxide in an amount up to ½ of the weight of said component (a).

10. Electroconductive composite ceramics of claim 8 wherein said component (b) is substituted by at least one metal oxide selected from the group consisting of chromium oxide and ferric oxide in an amount up to 9/10 of the weight of said component (b).

11. Electroconductive composite ceramics of claim 7 wherein said component (B) is metal oxides composed of (c) 30–97.5% by weight of zirconium oxide and (d) 70–2.5% by weight of at least one metal oxide selected from the group consisting of calcium oxide, scandium oxide, yttrium oxide, neodymium oxide, ytterbium oxide and thorium oxide.

12. Electroconductive composite ceramics of claim 7, wherein said component (B) is incorporated with at least one additive selected from the group consisting of silicon dioxide, tin oxide and zirconium oxide externally added in an amount up to 50% by weight of said component (B).

13. Electroconductive composite ceramics of claim 7, wherein said component (B) is incorporated with at least one additive selected from the group consisting of oxides of metals selected from titanium, molybdenum, tungsten, manganese, vanadium and lanthanoids externally added in an amount up to 3% by weight of said component (B).

14. Electroconductive composite ceramics of claim 11 wherein said component (B) is incorporated with at least one additive selected from the group consisting of oxides of metals selected from beryllium, magnesium, strontium, barium, zinc, iron, cobalt, nickel, aluminum, titanium, lanthanum, cerium, chromium, molybdenum and tungsten.

15. A process for the manufacture of electroconductive composite ceramics, comprising forming a mixture containing 50–98% by weight of insulating ceramics or semiconductive ceramics or a mixture thereof, mixing the mixture, shaping said mixture into conglomerates having a particle diameter of at least 20μ, drying said conglomerates, adding 50–2% by weight of an electroconductive substance to said conglomerates and thereafter sintering the mixture at 500°–2000° C.

16. A process for the manufacture of electroconductive composite ceramics, characterized by incorporating 50–98% by weight of insulating ceramics or semiconductive ceramics or a mixture thereof with or without a binder, mixing the mixture, shaping said mixture into conglomerates having a particle diameter of at least 20μ, drying and sintering said conglomerates at 500°–2000° C., adding 50–2% by weight of an electroconductive substance to the sintered ceramics with or without being processed to microcapsules, mixing the mixture and thereafter sintering said mixture at 500°–2000° C.

17. A process of claim 15 wherein said mixture container polyvinyl alcohol, denaturated starch or carboxymethylcellulose binder.

* * * * *